(12) United States Patent
Hickman

(10) Patent No.: US 8,525,853 B1
(45) Date of Patent: Sep. 3, 2013

(54) METHODS AND SYSTEMS FOR GENERATING A LAYERED DISPLAY OF A DEVICE

(75) Inventor: Ryan Hickman, Mountain View, CA (US)

(73) Assignee: Google Inc., Mountain View, CA (US)

(*) Notice: Subject to any disclaimer, the term of this patent is extended or adjusted under 35 U.S.C. 154(b) by 67 days.

(21) Appl. No.: 13/556,894

(22) Filed: Jul. 24, 2012

Related U.S. Application Data

(60) Provisional application No. 61/587,875, filed on Jan. 18, 2012.

(51) Int. Cl.
*G09G 5/00* (2006.01)

(52) U.S. Cl.
USPC ............ 345/630; 345/420; 345/581; 345/629

(58) Field of Classification Search
USPC .............................................. 345/418; 5/601
See application file for complete search history.

(56) References Cited

U.S. PATENT DOCUMENTS

| | | | |
|---|---|---|---|
| 7,171,286 B2 | 1/2007 | Wang et al. | |
| 7,262,573 B2 | 8/2007 | Wang et al. | |
| 7,502,498 B2 | 3/2009 | Wen et al. | |
| 7,761,185 B2 | 7/2010 | Wang et al. | |
| 2003/0098862 A1* | 5/2003 | Hunt et al. | 345/418 |
| 2005/0204438 A1 | 9/2005 | Wang et al. | |
| 2009/0070936 A1* | 3/2009 | Henderson et al. | 5/601 |
| 2011/0035054 A1 | 2/2011 | Gal et al. | |

\* cited by examiner

*Primary Examiner* — Phi Hoang
(74) *Attorney, Agent, or Firm* — McDonnell Boehnen Hulbert & Berghoff LLP

(57) ABSTRACT

Methods and systems for generating a screen interface for providing a layered display of a robot is provided. A computing device, such as the cloud may receive information associated with a robot and the received information may indicate components of the robot. The computing device may then generate a layered display of the robot based on the received information and provide the generated layered display on a screen interface. The screen interface may show a number of different views of the robot, including a structural view of the robot and a components view of the robot. The interface may provide information indicating capabilities of the robot or capabilities of the components of the robot. The screen interface may also show different layers of components of the robot, such as a functions layer, and a task group layer. The screen interface may further show modified configurations of the robot.

24 Claims, 9 Drawing Sheets

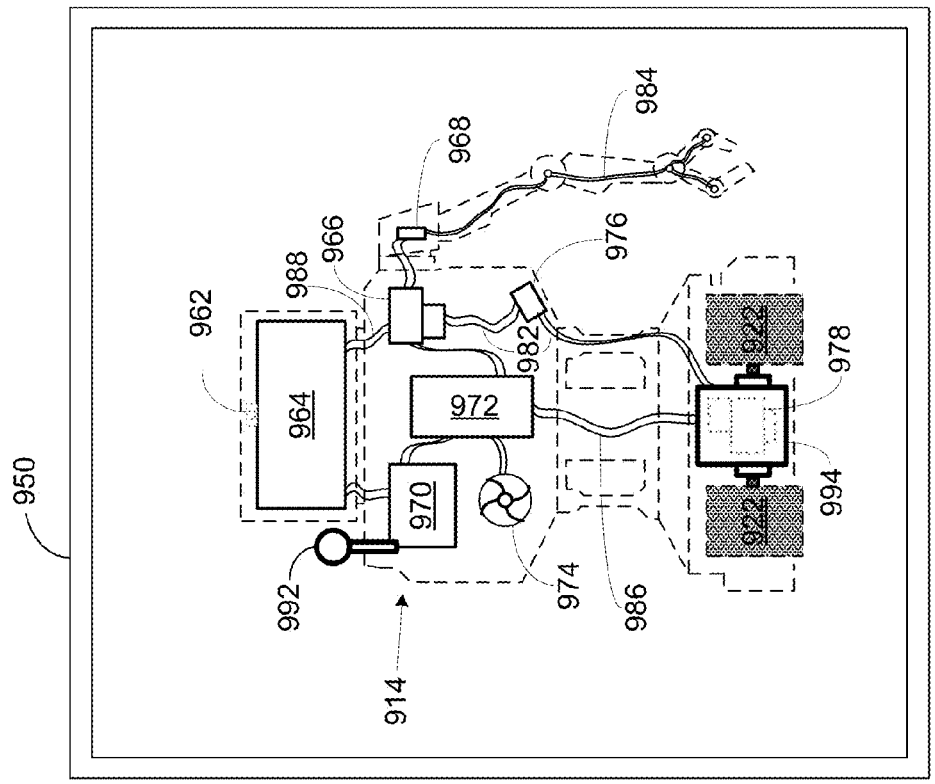
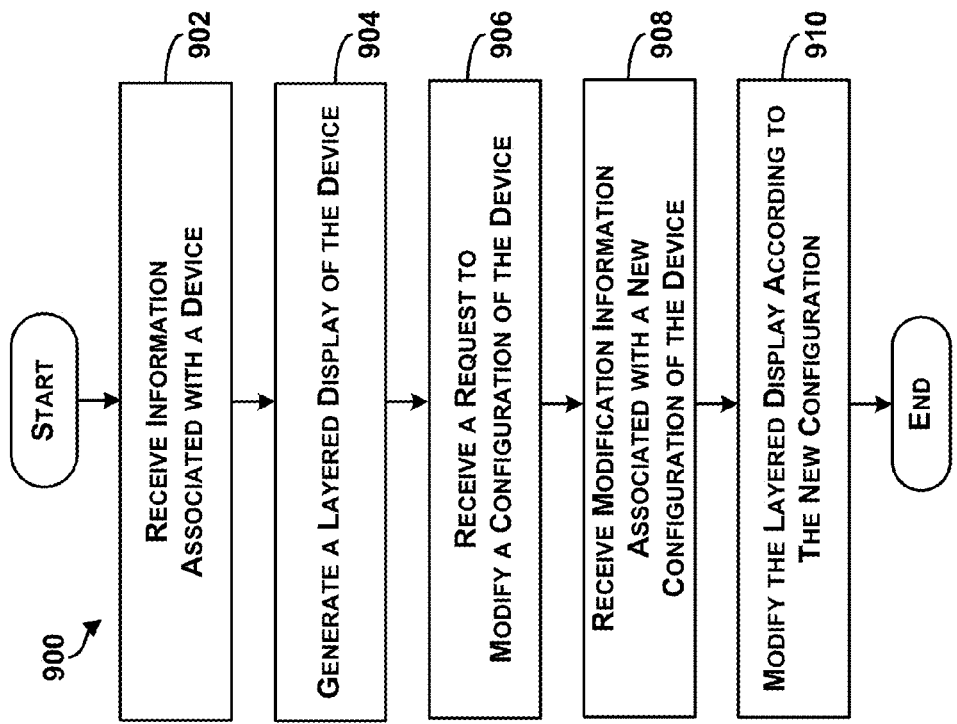
FIGURE 9B
FIGURE 9A

METHODS AND SYSTEMS FOR GENERATING A LAYERED DISPLAY OF A DEVICE

CROSS-REFERENCE TO RELATED APPLICATION

The present application claims priority to U.S. Provisional Application Ser. No. 61/587,875, filed on Jan. 18, 2012, the entire contents of which are incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing," however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one aspect, the client device may be a robotic device configured to interact with an environment. Through cloud computing, the robotic device may have access to the vast network of computing resources, and accordingly, computing abilities for interacting with the environment at varying levels of complexity.

In one example, a user may access a screen interface to view information associated with a device, such as the robotic device. The user may use the screen interface to connect to a host of web servers that collect commands from the user and interpret the commands into commands on the servers. The servers may handle the computing, and can either store or retrieve information from database servers or file servers and display information associated with the device to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

In one example, a method is provided that comprises receiving a request for a layered image of a remote robotic device having at least one sensor component and one mechanical actuator component, querying the remote robotic device for device information associated with the remote robotic device, the device information indicating components of the device including the at least one sensor component and one mechanical actuator component, receiving the device information associated with the remote robotic device, the information indicating components of the device, and generating the layered image of the remote robotic device based on the received device information, the layered image illustrating multiple layers, each layer of the layered image providing a representation of the remote robotic device and any components of the remote robotic device at the layer, wherein the layered image comprises an outer layer representing an external illustration of the remote robotic device and components of the remote robotic device and at least one inner layer representing an internal illustration of the remote robotic device and components of the remote robotic device, receiving a request to display a first layer of the remote robotic device, the first layer illustrating information associated with one or more of the at least one sensor component and one mechanical actuator component, and providing a display of the first layer of the remote robotic device.

In another example, a non-transitory computer readable medium with instructions stored thereon is provided. The instructions may be executable by a computing device to cause the computing device to perform functions. The functions comprise receiving a request for a layered image of a robotic device having at least one sensor component and one mechanical actuator component, querying the robotic device for device information associated with the robotic device, the device information indicating components of the device including the at least one sensor component and one mechanical actuator component, receiving device information associated with the robotic device, the device information indicating components of the robotic device, and generating the layered image of the robotic device based on the received device information, the layered image illustrating multiple layers, each layer of the layered image providing a representation of the device and components of the robotic device at the layer, wherein the layered image comprises an outer layer representing an external illustration of the robotic device and components of the robotic device and at least one inner layer representing an internal illustration of the robotic device and components of the robotic device, receiving a request to display a sensor layer of the robotic device, the sensor layer illustrating the at least one sensor component, and providing a display of the sensor layer of the robotic device.

In yet another example, a device is provided. The device includes a processor and memory. The memory has instructions stored therein executable by the processor to perform functions. The functions comprise receiving a request for a layered image of a robotic device having at least one sensor component and one mechanical actuator component, querying the robotic device for device information associated with the robotic device, the device information indicating components of the device including the at least one sensor component and one mechanical actuator component, receiving device information associated with the robotic device, the device information indicating components of the robotic device, and generating the layered image of the device based on the received device information, the layered image illustrating multiple layers, each layer of the layered image providing a representation of the robotic device and components of the device at the layer, wherein the layered image comprises an outer layer representing an external illustration of the robotic device and components of the robotic device and at least one inner layer representing an internal illustration of the robotic device and components of the robotic device, receiving a request to display a first layer of the robotic device, the first layer illustrating one or more of the at least one sensor component and one mechanical actuator component, and providing a display of the cognitive layer of the robotic device.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures,

FIG. 9A is a block diagram of an example method for providing in a layered display, a view of a modified configuration a device and components of the device; and FIG. 9B illustrates an example of a layered display providing a view of a modified configuration of a device and components of the device.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition/control. A robot may perform any actions or queries to the cloud as described herein based on contextual or situational information.

1. CLOUD COMPUTING ARCHITECTURE

Figure 1:
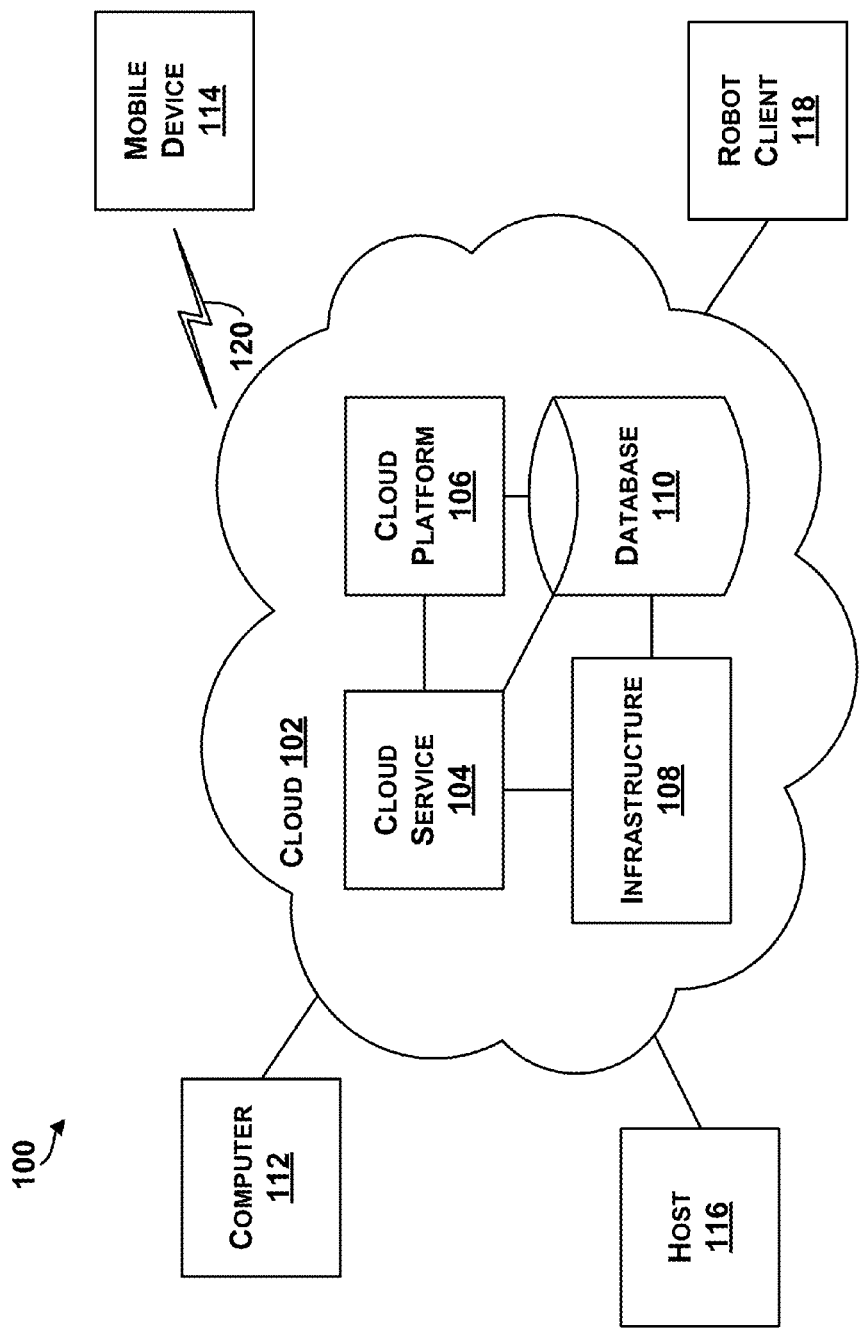
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of the server devices' processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touch-screen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. EXAMPLE ROBOT ARCHITECTURE

Figure 2A:
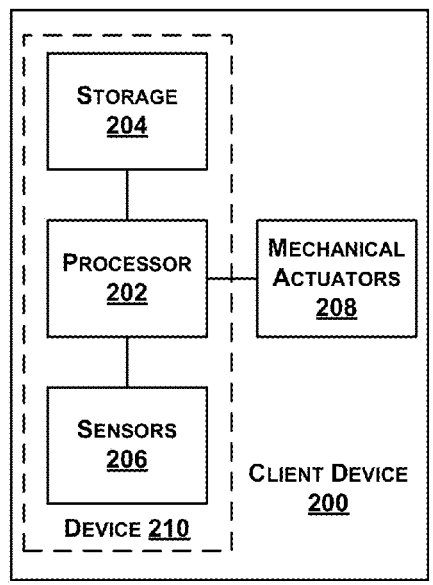
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the Internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch-screen, etc., that are included within the device 210.

Figure 2B:
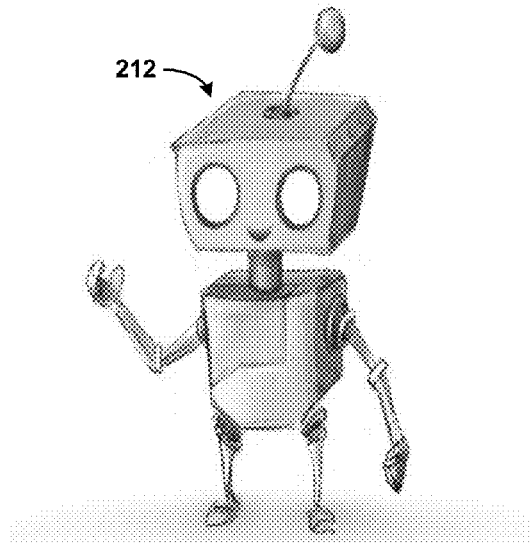
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
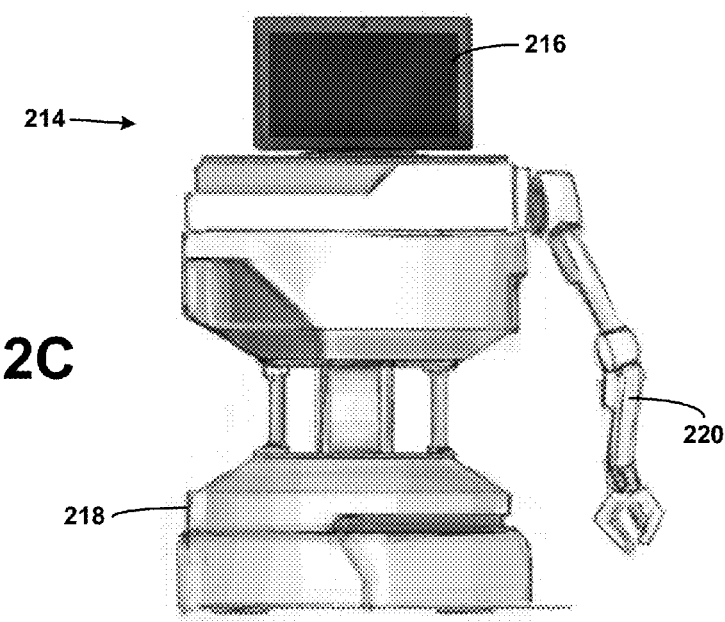
FIG. 2C illustrates another example of a robot.

FIG. 2C illustrates another example of a robot 214. The robot 214 includes a computing device 216, a mobility base 218, and a mechanical actuator 220. In this example, the computing device 216 may be a laptop computer, which may be coupled to sensors. The sensors may include a camera, infrared projectors, and other motion sensing or vision sensing elements. The mobility base 218 may include a base, wheels and motor upon which the computing device 216 can be positioned, for example. The mechanical actuator 220 may include joints and motors constituting an arm that can be used to perform certain physical tasks, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. ROBOT AND CLOUD INTERACTION

Figure 3:
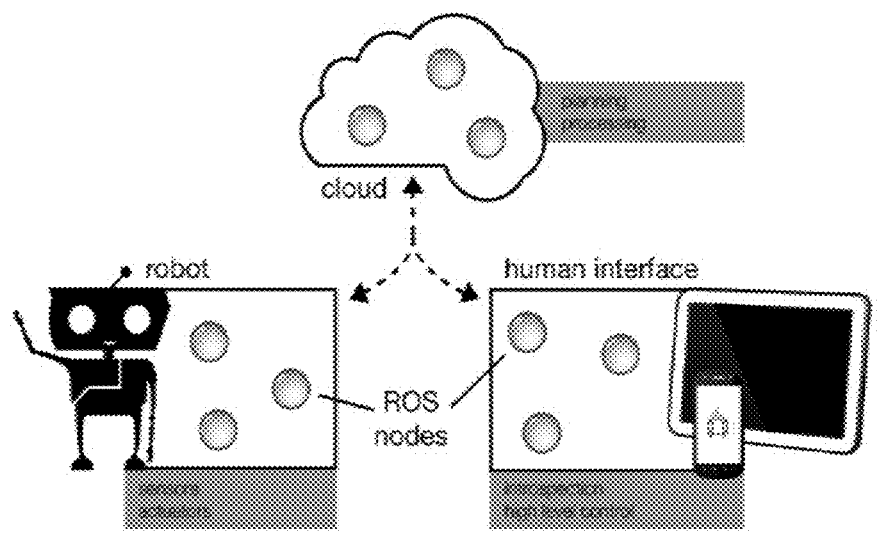
FIG. 3 illustrates an example of a conceptual robot-cloud interaction.

FIG. 3 illustrates an example of a conceptual robot-cloud interaction. A robot, such as a robot described and illustrated in FIGS. 2A-C, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot. In some cases, different modules may have been implemented based on different ROS. In these cases, the cloud may facilitate communication between the different modules.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Further, a user may receive, at a user interface, data from the robot via the cloud. The user may further access the user interface to send data to the robot via the cloud. For instance, the user may receive image data representative of a surrounding environment of the robot, and provide navigation instructions for the robot to traverse the environment.

Figure 4:
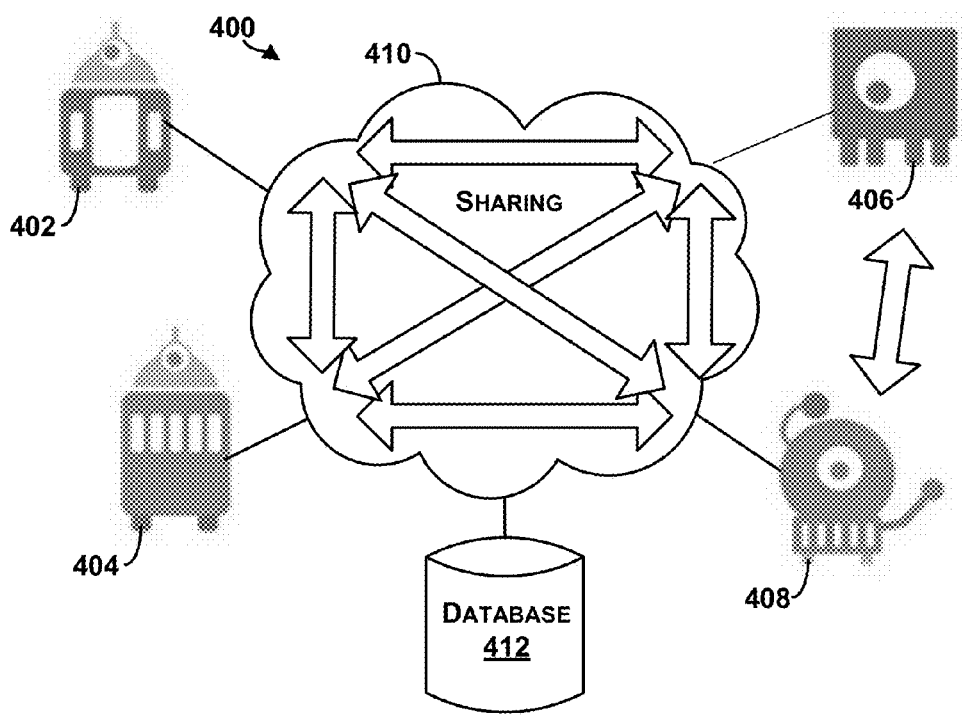
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and builds a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. LAYERED DISPLAY FOR ROBOT

In addition to interacting with robots in the different ways as described above, the cloud may also provide robot information via a layered display. The layered display may provide information about a robot, and may be implemented on an interface accessed from a computer on a personal device such as a mobile phone, or on a user interface attached to another robot. In one example, a user may provide input to the interface through a mouse and keyboard, or through touch if the interface is implemented on a touch-screen capable device. The robot information provided on the layered display may be used for viewing capabilities of a robot, determining if maintenance is required for the robot or components of the robot, or exploring component modification possibilities of the robot, among other applications.

Figure 5B:
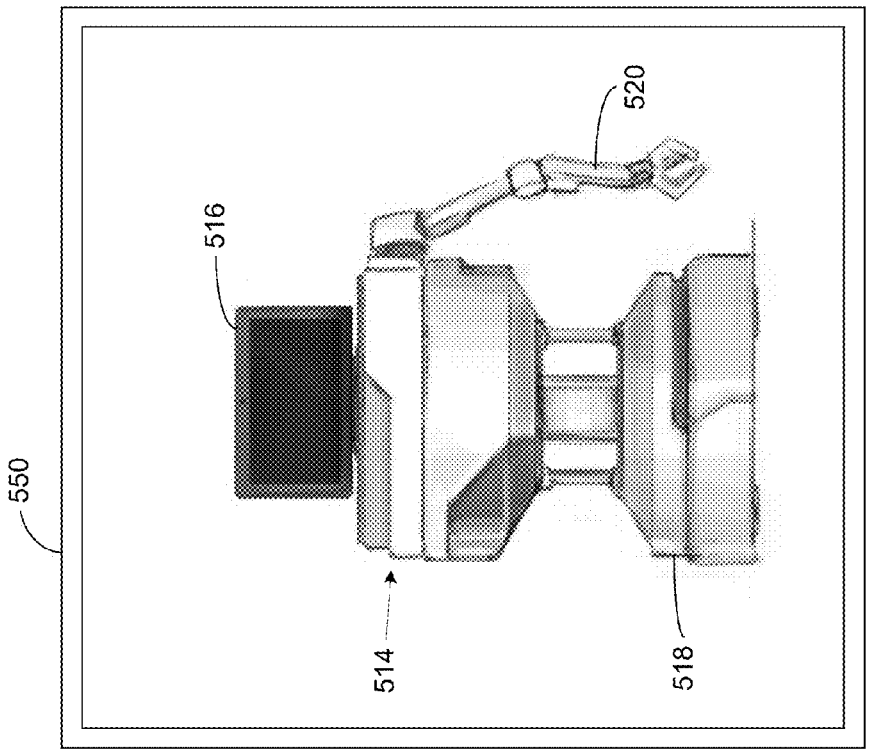
FIG. 5B illustrates an example of a layered display providing a view of an external layer of a device and components of the device.
Figure 5A:
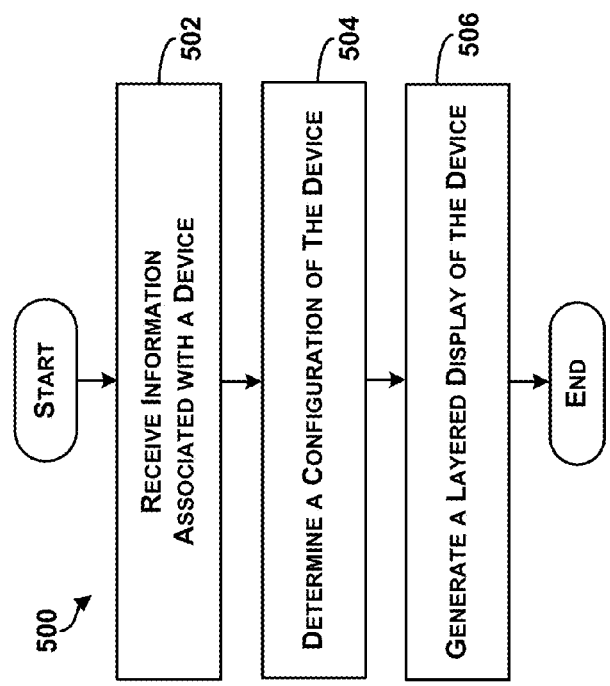
FIG. 5A is a block diagram of an example method for generating a layered display of a device and components of the device.

FIG. 5A is a block diagram of an example method 500 for generating a layered display of a robot, in accordance with at least some embodiments described herein. Method 500 shown in FIG. 5A presents an embodiment of a method that could be used with the systems 100 and 400 for example, and may be performed by a device, such as other devices illustrated in FIGS. 1-4, or components of the device. Method 500 may include one or more operations, functions, or actions as illustrated by one or more of blocks 502-506. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 502, the method 500 includes receiving information associated with a device. In one example, the device is a robot, and the information indicates or is associated with components of the robot. In one case, the robot may be at a remote location from where the generated layered display may be provided. The information may be in the form of a manifest, which lists the components attached to the robot. The information may further indicate capabilities and compatibilities of the components. In addition, the information may also indicate a maintenance record of the components attached to the robot, such as component service dates or battery replacement histories. In one case, the information associated with the robot may be received after querying the robot or a server for the information associated with the device. In this case, the query for device information may have been initiated by receiving a request for the layered display of the robot. The request for the layered display of the robot may include identification information such as a serial number for the robot, such that device information may be retrieved according to the serial number.

In an example, the information associated with the robot is received from the robot. In this instance, the robot may maintain a copy of the robot's manifest on a memory storage device attached to the robot, and the robot's local copy of the manifest can be updated each time a change to the components of the robot occurs, or each time the robot or a component of the robot is serviced.

In another example, the information associated with the robot may be received from a server. For instance, the data storage server may be part of a network of servers and computing devices constituting the cloud. In a further example, the information associated with the robot may be received in part from the robot and in part from a server. For instance, the part of the information associated with the robot received from the robot may include a list of the components attached to the robot, and the part of the information associated with the robot received from the server may include capability and compatibility data for the components attached to the robot.

At block 504, the method 500 includes determining a configuration of the device. In one example, based on the received information, which may indicate capabilities or compatibilities of components of the robot, a configuration of the robot can be determined by accessing a database. The database may include information indicating possible configurations of components. The received information may further include a model number of the robot (or components), and the database can be accessed to determine a configuration of the robot and components based on the model number. The database may be maintained by manufacturers of robots and updated to include new configurations.

A computing device may receive the information at block 502 and determine a configuration of the robot that includes an external configuration and an internal configuration, for example.

At block 506, the method 500 includes generating a layered display of the device. In one example, the layered display can be generated based on the received information and determined configuration associated with the device. Accordingly, the received information may further include structural information of the device and the components of the robot, such as physical dimensions and range of motion for movable components. The received information may also indicate a configuration of each of the components of the device. In this case, the configuration of each of the components may indicate how each component of the device is positioned and attached to the device as well as how each component of the device is interconnected.

In one example, the layered display may illustrate multiple layers of the device, including an outer layer and an inner layer. In this case, each layer of the layered display provides a representation of the device and any components of the device at the layer. In one instance, the layered display may include an outer layer representing an external illustration of the device and components of the device. In this instance, the outer layer may illustrate colors and decals of the robot as well as components at least partially attached to the outside of the robot. The outer layer may thus include a physical representation of the device, and may include images of the device, for example. In another instance, the layered display may include at least one inner layer representing an internal illustration of the device and components of the device. In this instance, the at least one inner layer may illustrate computer processors and motors not viewable from an external view of the robot.

In a further example, the layered display may be generated as a three-dimensional display. In one example, three-dimensional display can be an image rendered from a three-dimensional representation of the device and components of the device. In this instance, the three-dimensional representation of the device and components of the device may be rotated on a screen interface and viewed from different angles.

The layered display may be generated by a computing device, by a server on a cloud, by the robotic device, or by a combination of any of these devices. The layered display may be output to any component and provided to a display device. In one example, the layered display may be output on an interface, such as a graphical user interface (GUI) that is configured to enable user interaction with the layered display. For instance, the interface may receive inputs indicating or requesting a specific view of the layered display (e.g., an external illustration of the device, an internal illustration of the device, or a combination of external/internal illustration). In a specific example in which the interface is provided by a server on the cloud, the interface may receive a request for a view of the robot, access a database (as needed) to determine a configuration of the robot, generate a layered display according to the request, and provide the layered display to a computing device for display to a user.

FIG. 5B illustrates an example of a layered display 550 providing a view of an external layer of a device. In one example, the device includes a robot 514, similar to the robot 214 of FIG. 2C. In this example, the external layer of the robot 514 may include a computing device 516, a mobility base 518 and a mechanical actuator 520, similar to the computing device 216, mobility base 218 and mechanical actuator 220, respectively, as described in reference to the robot 214 in FIG. 2C. The external layer of the device may include a picture or an image of the device.

In one example, the at least one inner layer representing an internal illustration of the device and components of the device may be a structural layer. The structural layer of the device may include parts of the device which may provide physical structural integrity of the device. In one instance, the cloud may determine whether a component of the device is to be included in the structural layer based on the received information associated with the device. In this case, the received information may indicate whether a component of the device provides physical structural support for the device.

Figure 5D:
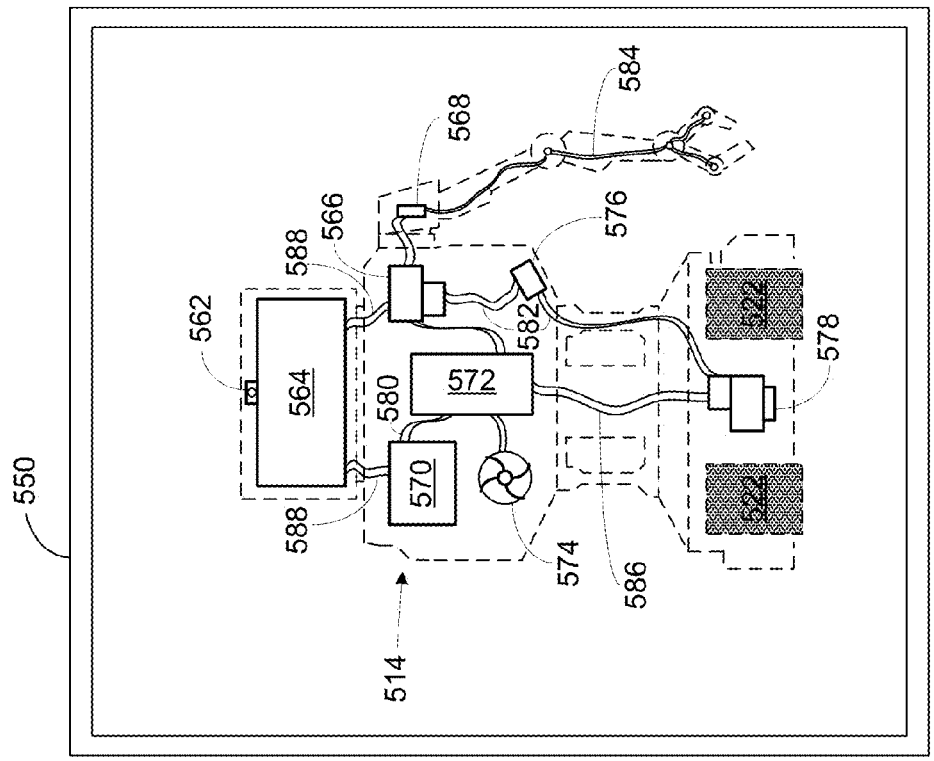
FIG. 5D illustrates an example of a layered display providing a view of components and interconnects layer of a device.
Figure 5C:
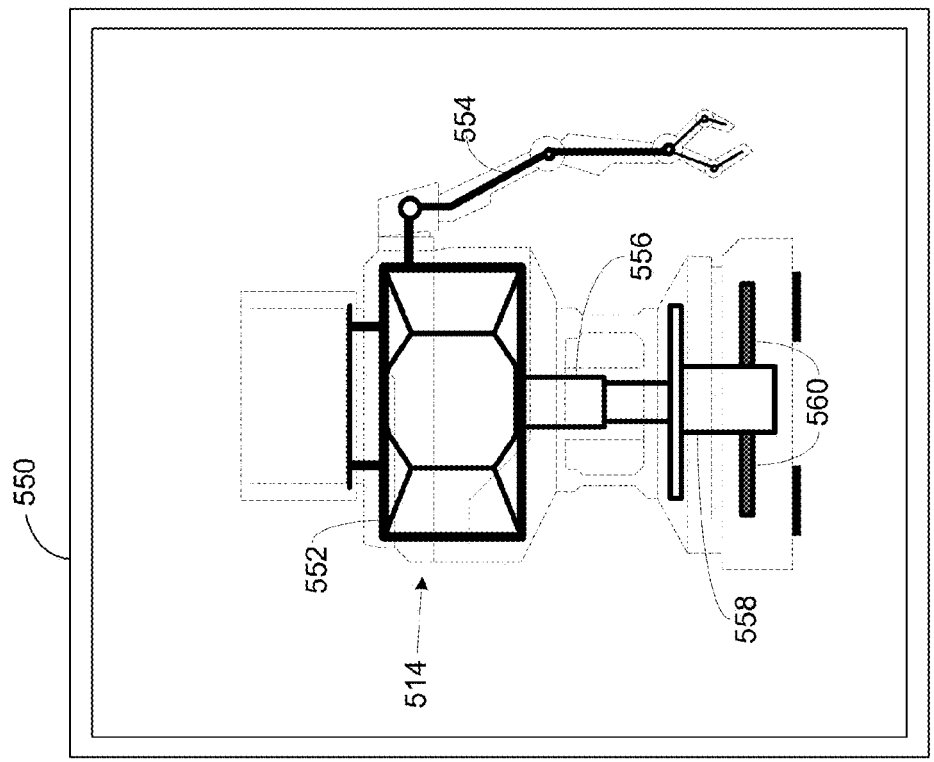
FIG. 5C illustrates an example of a layered display providing a view of a structural layer of a device and components of the device.

FIG. 5C illustrates an example of the layered display 550 providing a view of a structural layer of a device. In one instance, the device is a robot 514, similar to the robot 214 of FIG. 2C. As provided on the layered display 550, the structural layer of the robot 514 may include a main chassis 552, a mechanical arm skeleton 554, a hydraulic suspension structure 556, a mobility base structure 558, and a wheel axle 560, each of which may provide physical structural support for the device. The structural layer of the robot 514 may include other components as well depending upon a configuration of the robot 514.

In another example, the at least one inner layer representing an internal illustration of the device and components of the device may be a components and interconnects layer. FIG. 5D illustrates an example of the layered display 550 providing a view of a components and interconnects layer of the robot 514. As provided on the layered display 550, the components and interconnects layer of the robot 514 may illustrate a number of the internal components of the device, which may include a video capturing device 562, a user interfacing device 564, a power transformer device 566, a mechanical actuator control device 568, a computing device 570, a robot control device 572, a heat dissipation device 574, a power interface device 576, a robot mobility component 578, and motorized wheels 522. The components and interconnects layer of the robot 514 may further illustrate connections between different components of the device. As shown on the layered display 550, connections between the different components of the device may include interconnects 580, 582, 584, 586 and 588. In another example, the layered display 550 may provide a view of a components-only layer, where only the components of the device 562, 564, 566, 568, 570, 572, 574, 576, and 578 are shown. In yet another example, the layered display 550 may provide a view of a connections-only layer, where only the interconnects 580, 582, 584, 586, and 588 are shown. A configuration of the layered display 550 may be determined by a user and adjusted as desired by the user.

In addition to providing a view of different components of a device, the capabilities of each component of the device may also be provided. FIG. 6A is a block diagram of an example method 600 for providing on a layered display information indicating capabilities of a robot, in accordance with at least some embodiments described herein. Method 600 presents an embodiment of a method that, for example, could be used with the systems 100 and 400, for example, and may be performed by a device, such as another devices illustrated in FIGS. 1-4, or components of the device. The various blocks of method 600 may be combined into fewer blocks, divided into additional blocks, and/or removed based upon the desired implementation.

At block 602, the method 600 includes receiving information associated with a device, similar to block 502 of the method 500, such that the received information may indicate components of the device, and such that the device may be a robot. At block 604, the method 600 includes generating a layered display of the device, similar to block 504 of method 500.

At block 606, the method 600 includes receiving information indicating capabilities of the device and device components. In one example, the received information indicating capabilities of the robot 514 may provide capability information for computing components of the device, such as attached personal computers or control units for various device functions. The capability information for the computing components may include processor speeds and storage memory capacities (e.g., available hard drive space or RAM size). The capability information for the computing components may further include input and output compatibilities.

In another example, the received information indicating capabilities of the robot 514 may provide capability information for mechanical actuator components of the device, such as robotic arms, or device mobility units. The capability information for mechanical actuator components of the device may include movement speeds and power, rotational speeds and torque, weight-bearing ratings, and range of motion values.

In yet another example, the information indicating capabilities of the robot may further provide a maintenance record of the robot or a component of the robot. In one instance, the maintenance record may indicate installation, usage, and maintenance histories of the robot or component of the robot.

In a further example, the received information indicating capabilities may provide capability information of the robot as a complete system. In this instance, the cloud may process the capability information for components of the robot and the received information associated with the robot to determine complete robot system capability information such as robot movement speed, robot turning radius, vertical reach of robotic arms, and strength of the robotic arms, for example. In one example, the vertical reach of a complete robot system may be the sum of an extendable length of a robotic arm attached to the robot and a vertical height of the robot at which the robotic arm is attached.

At block 608, the method 600 includes providing in the layered display the information indicating the capabilities of the device or the given component of the device. In one example, the capabilities of the robot or a component of the robot may be presented as a list next to or proximate to the robot or component of the robot shown in the layered display on an interface. In a further example, the layered display may provide a zoomed-in view of a component shown in the layered display when capabilities of the component are provided.

In another example, the information indicating capabilities of the robot and components of the robot is provided in the layered display in response to a request from a user. In this instance, the user may select a component and request to view capabilities of the selected component, prompting the layered display to provide in the layered display the information indicating capabilities of the selected component.

Figure 6B:
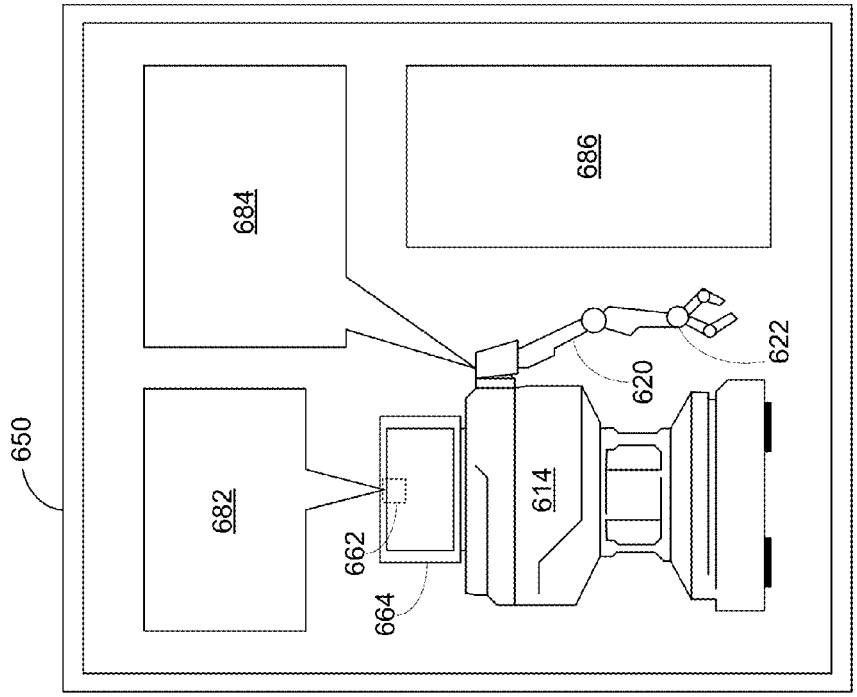
FIG. 6B illustrates an example of a layered display providing information indicating capabilities of a device and components of the device.
Figure 6A:
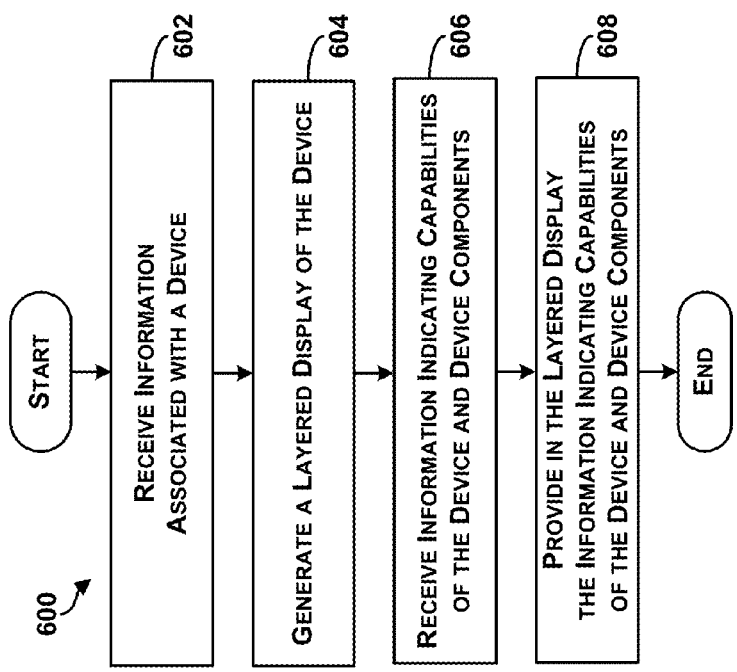
FIG. 6A is a block diagram of an example method for providing in a layered display, information indicating capabilities of a device and components of the device.

FIG. 6B illustrates an example of a layered display 650 providing information indicating capabilities of a device. In one instance, the device is a robot 614, similar to the robot 214 of FIG. 2C. In a display of the capabilities of the robot 614, video capture device capabilities information list 682 indicating capabilities of a video capturing device 662 is provided, and robotic arm capabilities information list 684 indicating capabilities of a robotic arm 620 is also provided. The display of the capabilities of robot 614 may further provide a complete robot system capabilities information list 686.

In one example, the video capture device capabilities information list 682 may provide a list of capabilities of the video capture device 662, such as maximum and minimum resolutions and frame rates at which the video capture device 662 can capture video. The list of capabilities of the video capture device 682 may further include different formats (e.g. MPEG2, MOV, WMV) or colors (e.g. black and white, true color) in which video can be captured by the video captured device 682.

In a further example, the video capture device 662 may be a part of a user interface device 664. In this instance, a user interface device information list may provide a list of capabilities of the user interface device 662, including the capabilities of the video capturing device 662 as may be provided in the video capture device capabilities information list 682.

In another example, the robotic arm capabilities information list 684 may provide a list of capabilities of the robotic arm 620, such as load bearing ratings, range of motion, rotational speeds, and extension speeds. In one instance, the robotic arm capabilities information 684 may include capabilities information for a joint 622 of the robotic arm. In a further example, the layered display 650 may provide a robotic arm joint capabilities information list in the layered display of the robot 614.

In yet another example, the robot system capabilities information list 686 may include complete robot system capability information of the robot 614. As discussed above, device system capability information may be determined by the cloud through processing capabilities information of components of the device. In one example, as discussed above, a vertical reach of a robotic arm may be provided in the robot systems capabilities information list 686, and the vertical reach of the robot may be calculated according to an extendable length of the robotic arm and a vertical height of the robot at which the robotic arm is attached. In a further example, a forward movement acceleration of the robot may be provided in the complete robot system capabilities information list 686. In this instance, the forward movement acceleration may be determined by processing weight information for each of the components of the robot and the rotational power of a robot movement motor.

In addition to providing a view of each component of a device, as shown in on the exemplary layered display in FIG.

5D, a subset of components of the device can be shown in a layered display of the device according to functions of the components of the device. FIG. 7A is a block diagram of an example method 700 for providing on a layered display a view of a functions layer of a device, in accordance with at least some embodiments described herein. Method 700 presents an embodiment of a method that, for example, could be used with the systems 100 and 400, for example, and may be performed by a device, such as one or another of the devices illustrated in FIGS. 1-4, or components of the device. The various blocks of method 700 may be combined into fewer blocks, divided into additional blocks, and/or removed based upon the desired implementation.

At block 702, the method 700 includes receiving information associated with a device and indicating functions of the components of the device. Similar to block 502 of the method 500, the device may be a robot and the received information may indicate components of the robot. In this instance, the received information further indicates functions of the components of the robot. In one example, the functions of a component of the robot may define uses of the component. For instance, a user interfacing device such as a computer keyboard, mouse or touchpad may be used for receiving inputs from a user. As such, the function of a user interface device may be input reception. In another instance, heat dissipation devices such as fans or heat sinks may be used for dissipating heat from a number of the components of the device. Some of the fans or heat sinks may further be a part of the components for which they dissipate heat. In this case, the function of heat dissipating devices such as fans or heat sinks is heat dissipation.

In one example, a computing device such as a personal computer, a robot control device for monitoring and controlling components of a robot, and a control unit of a robot mobility component for monitoring and controlling the movement of a robot may each be used for processing information and providing an output based on the processed information. In this case, each of the computing device, robot control device, and control unit of the robot mobility component have a similar function of data processing. Accordingly, the computing device, robot control device and control unit of the robot mobility component may be part of a data processing layer, i.e., a cognitive layer.

At block 704, the method 700 includes generating a layered display of the device, similar to block 504 of method 500. In one example, the at least one inner layer of the layered display includes a cognitive layer illustrating components having a similar function of data processing, as discussed above. In another example, the at least one inner layer of the layered display includes a sensor layer illustrating sensor components. In this case, the sensor layer may illustrate a speed detector, a light sensor, or any device that measures a physical quantity from a surrounding of the device and converts the physical quantity into a signal.

At block 706, the method 700 includes receiving a request to view the functions layer. In one example, a user may access an interface providing the generated layered display of the robot and may request to view a functions layer, such as a cognitive layer or a sensor layer.

At block 708, the method 700 includes providing the functions layer in the layered display. In one example, the interface on which the layered display is provided may provide a view of the functions layer requested by the user. In a further example, the interface may also provide information associated with components included in the displayed functions layer. In one instance, the information associated with the components provided on the interface may include capabilities information. In this case, the capabilities information may be provided in accordance with the method 600.

Figure 7B:
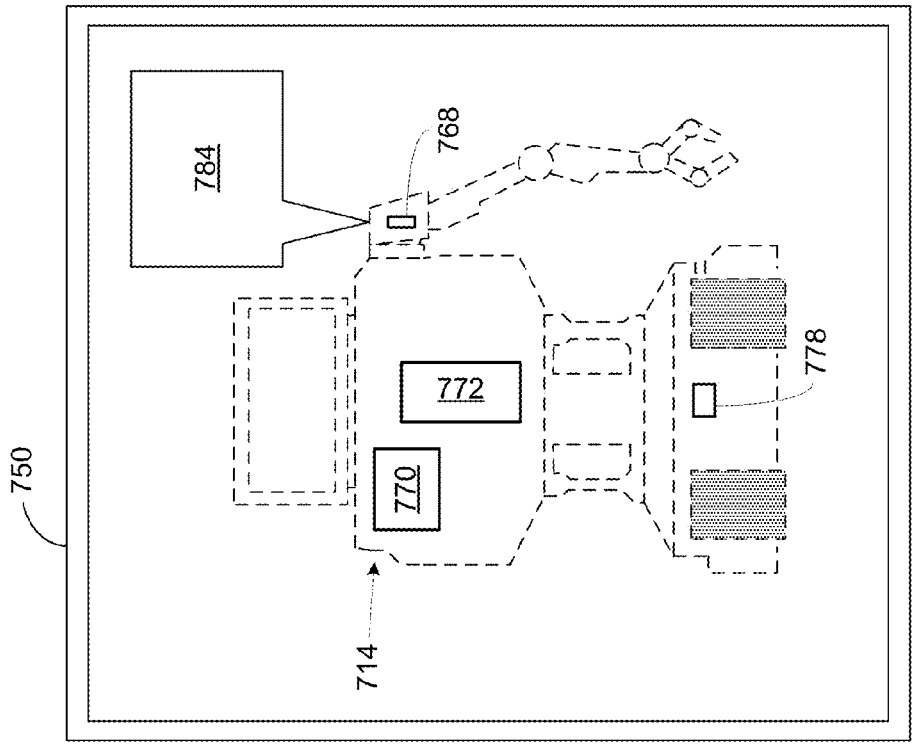
FIG. 7B illustrates an example of a layered display providing a view of a functions layer of a device and components of the device.
Figure 7A:
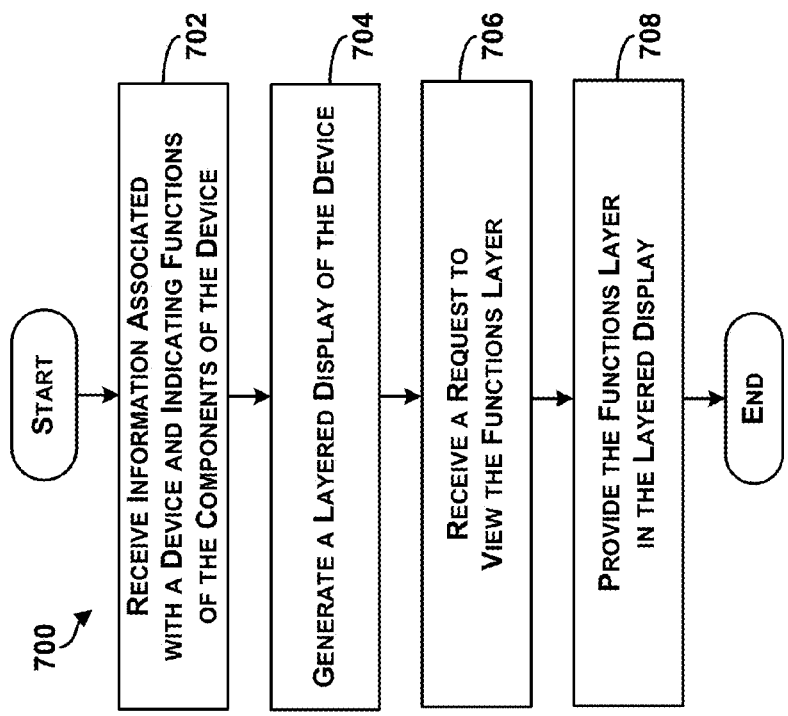
FIG. 7A is a block diagram of an example method for providing in a layered display, a view of a functions layer of a device and components of the device.

FIG. 7B illustrates an example of a layered display 750 providing a view of a functions layer of a device. In one instance, the device is a robot 714, similar to the robot 214 of FIG. 2C. In one example, the functions layer of the robot can be a cognitive layer as discussed above. In this case, the cognitive layer may include a mechanical actuator control device 768, a computing device 770, a robot control device 772, and a control unit 778 of a robot mobility component.

In one example, the mechanical actuator control device 768 may receive data indicating a desired motion of a robot arm and may process the received data and provide control data to the robot arm to perform the desired motion. In a similar manner, the control unit 778 of the robot mobility component may receive data indicating a desired movement speed of the robot and may process the received data and provide control data to the mobility component to move the robot at the indicated movement speed. In an example, the computing device 770 may receive a request for information on a status of a robot component. The computing device may then process the request and retrieve information on the status of the robot component. In another example, the robot control device 772 may receive an input from the computing device 770 requesting forward movement of the robot. The robot control device 772 may then process the request to move forward and send a request to the control unit 778 of the robot mobility component.

As discussed above, the layered display 750 may also provide in the layered display information indicating the functions of the components illustrated in the functions layer. In one example, a mechanical actuator control device information box 784 may be provided in the same layered display showing a functions layer including the mechanical actuator control device 768. In one instance, the mechanical actuator control device information box 784 may list capabilities of the mechanical actuator control device 768.

In addition to providing a view of each component of a device, as shown on the exemplary layered display in FIG. 5D, or a view of a subset of components of the device having similar function as shown in FIG. 7B, a task group layer showing a group of components utilized to perform a task can also be provided by the interface. FIG. 8A is a block diagram of an example method for providing on a screen interface, a view of a task group layer of a device, in accordance with at least some embodiments described herein. Method 800 presents an embodiment of a method that, for example, could be used with the systems 100 and 400, for example, and may be performed by a device, such as one or another of the devices illustrated in FIGS. 1-4, or components of the device. The various blocks of method 800 may be combined into fewer blocks, divided into additional blocks, and/or removed based upon the desired implementation.

At block 802, the method 800 includes receiving information associated with a device and indicating task groups of the components of the device. Similar to block 502 of the method 500, the device may be a robot and the received information may indicate components of the robot and further indicate components of the robot utilized to perform a task. In one example, components utilized to perform a task may constitute a task group. For instance, a movement control processor, an accelerometer, and a motorized wheel may be utilized to perform a movement task. As such, the movement control processor, accelerometer and motorized wheel may constitute a movement task group. In another instance, a receiver, a transmitter, and a communications control processor may be used for communicating with the cloud. In this case, the receiver, transmitter and communications control processor may constitute a communications task group. In a further example, the communications task group and an image capture device may be used for capturing an image of an object and recognizing the object using cloud computing. In this case, the communications task group and the image capture device may constitute an object recognition task group.

At block 804, the method 800 includes generating a layered display of the device, similar to block 504 of method 500. In one example, the at least one inner layer of the layered display is a movement task group layer illustrating components utilized for movement of the robot, as described above. In another example, the at least one inner layer of the layered display is a video capture task group layer. In this case, the video capture task group layer may illustrate a video camera, a video processor unit, and a video storage unit, for example.

At block 806, the method 800 includes receiving a request to view the task group layer. In one example, a user may access an interface providing the generated layered display of the robot and may request to view a task group layer, such as a movement task group layer or a video capture task group layer.

At block 808, the method 800 includes providing the task group layer in the layered display. In one example, the interface on which the layered display is provided may provide a view of the task group layer requested by the user. In a further example, the layered display may also provide information associated with components included in the displayed task group layer. In another example, the screen interface may further provide information associated with the task performed by the components in the displayed task group layer. In one instance, the information associated with the components or the task provided on the screen interface may include capabilities information. In this case, the capabilities information may be provided in accordance with the method 600.

Figure 8B:
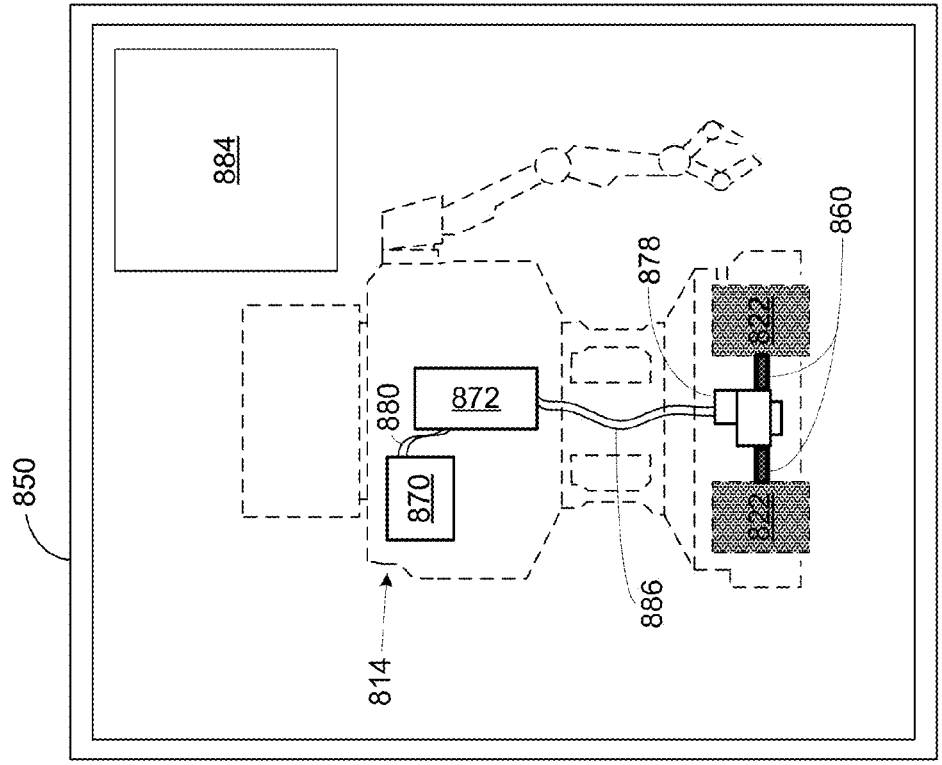
FIG. 8B illustrates an example of a layered display providing a view of a task group layer of a device and components of the device.
Figure 8A:
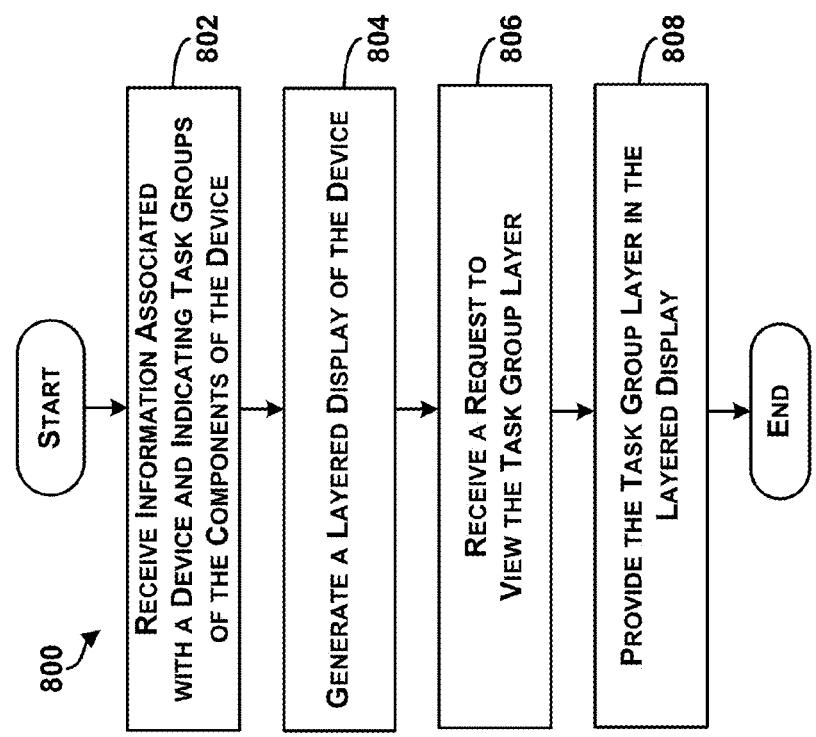
FIG. 8A is a block diagram of an example method for providing in a layered display, a view of a task group layer of a device and components of the device.

FIG. 8B illustrates an example of a layered display 850 providing a view of a task group layer of a robot. In one instance, the device is a robot 814, similar to the robot 214 of FIG. 2C. In one example, the task group layer of the robot may be a movement task group layer as discussed above. In this case, the movement task group layer may include a computing device 870, a robot control device 872, a robot mobility component 878, wheel axle 860, and motorized wheels 822. The movement task group layer may further include an interconnect 880 for coupling the computing device 870 with the robot control device 872, and an interconnect 886 for coupling the robot control device 872 with the robot mobility component 878.

In one example, the robot control device 872 may receive an input from the computing device 870 requesting forward movement of the robot. In one instance, the computing device 870 may request forward movement according to an instruction received from the cloud. In response to the input from the computing device 870, the robot control device 872 may then process the request for forward movement of the robot and send a request to the robot mobility component 878. The robot mobility component 878 may rotate the wheel axle 860 thereby rotating the motorized wheels 822 for forward movement of the robot.

As discussed above, the layered display 850 may also provide information associated with components included in the displayed task group layer or information associated with the task performed by the components in the displayed task group layer. In one example, a movement task group information box 884 may be provided in the same layered display showing the movement task group layer. In one instance, the movement task group information box 884 may list capabilities of a component of the movement task group, such as listing a processor speed of the computing device 870. In another instance, the movement task group information box 884 may list capabilities of the movement task group, such as maximum movement speed, maximum acceleration, or a response time indicating the time it takes for a robot to begin movement after receiving a request for movement from the cloud.

In one example, the device which the layered display is generated to provide an illustration of may be modified, and the layered display of the device may be updated. In another example, a user accessing the layered display may be interested in modifying the device to be in a new configuration and would like to see a layered display of the device in the new configuration without making actual modifications to the robot. FIG. 9A is a block diagram of an example method for providing on a screen interface, a view of a modified configuration a robot, in accordance with at least some embodiments described herein. Method 900 presents an embodiment of a method that, for example, could be used with the systems 100 and 400, for example, and may be performed by a device, such as another devices illustrated in FIGS. 1-4, or components of the device. The various blocks of method 900 may be combined into fewer blocks, divided into additional blocks, and/or removed based upon the desired implementation.

At block 902, the method 900 includes receiving information associated with a device, similar to block 502 of the method 500. At block 904, the method 900 includes generating a layered display of the device, similar to block 504 of method 500. In one example, the device may be a robot.

At block 906, the method 900 includes receiving a request to modify a configuration of the robot from a current configuration to a new configuration. In one example, the request to modify a configuration of the robot may be received from the cloud or from the robot. In another example, the request to modify may be received at the layered display from a user accessing an interface providing the layered display. In this instance, the user wishes to view to layered display of a new configuration of the robot without making actual modifications to the robot.

At block 908, the method 900 includes receiving modification information associated with a new configuration of the device. In one example, the modification information associated with a new configuration of the robot may be received at around the same time the request to modify a configuration of the robot of block 906 is received. In another example, the cloud may send a request to the robot or to the user accessing the interface requesting the modification information associated with a new configuration of the robot.

In one example, the modification information associated with a new configuration of the robot may be received in the form of a new configuration manifest, which may list the components attached to robot according to the new configuration. In another example, the modification information may be in the form of a change list, which lists the differences between the new configuration of the robot and the current configuration of the robot. In a further example, the modification information associated with a new configuration of the robot may further indicate components of the new configuration of the device. In this case, the modification information may include capabilities information on the components of the new configuration of the device.

At block 910, the method 900 includes modifying the layered display according to the new configuration. In one example, the layered display may be modified according to the new configuration of the device by generating a new layered display of the device according to the modification information associated with the new configuration. In another example, the layered display may be modified according to the new configuration by removing illustrations of components in the current configuration of the device but not in the new configuration of the device, and adding illustrations of components in the new configuration of the device but not in the current configuration of the device.

In another example, the layered display may be further modified according to the new configuration by providing a super-imposed layered display of the modified layered display including the new configuration of the device and the layered display of the current configuration of the device. The super-imposed layered display may include a modified layered display overlaid onto a current layered display, for example. In one instance, the components in the current configuration may be emphasized to indicate that the components are not in the new configuration. In another instance, the components in the new configuration may be emphasized to indicate that components are not in the current configuration. In one example, components may be emphasized by being highlighted. In another example, components may be emphasized by being dimmed.

FIG. 9B illustrates an example of a layered display 950 showing a view of a modified configuration of a device. In one example, the device is a robot 914. As provided on the layered display 950, a new configuration of the robot 914 may include a new model video capturing device 992, a user interfacing device 964, a power transformer device 966, a mechanical actuator control device 968, a computing device 970, a robot control device 972, a heat dissipation device 974, a power interface device 976, a new model robot mobility component 994, and motorized wheels 922. In another example, the new configuration of the robot 914 may further illustrate connections between the different components of the robot 914. As shown on the layered display 950, connections between the different components of the robot 914 may include interconnects 980, 982, 984, 986 and 988.

In a further example, a super-imposed layered display of the new configuration of the robot 914, and the current configuration of the robot 914 may be provided on the layered display 950. In comparison to the new configuration of the robot 914, the current configuration of the robot 914 may have a current model video capturing device 962 instead of the new model video capturing device 992, and a current model robot mobility component 978 instead of the new model robot mobility component 994.

In one example, the current model video capturing device 962 and the current model robot mobility component 978 may be emphasized to indicate that the current model video capturing device 962 and the current model robot mobility component 978 are in the current configuration and not in the new configuration of the robot 914. As shown in FIG. 9B, the current model video capturing device 962 and the current model robot mobility component 978 are emphasized by being outlined in lighter colored dotted lines. In another example, the new model video capturing device 992 and the new model robot mobility component 994 may be emphasized to indicate that the new model video capturing device 992 and the new model robot mobility component 994 are in the new configuration and not in the old configuration of the robot 914. As shown in FIG. 9B, the new model video capturing device 992 and the new model robot mobility component 994 may be emphasized by being outlined in bold.

5. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A method comprising:
   receiving a request for a layered image of a remote robotic device having at least one sensor component and one mechanical actuator component;
   querying the remote robotic device for device information associated with the remote robotic device, the device information indicating components of the device including the at least one sensor component and one mechanical actuator component, and indicating functions of the components of the remote robotic device;
   receiving the device information associated with the remote robotic device;
   generating the layered image of the remote robotic device based on the received device information, the layered image illustrating multiple layers, each layer of the layered image providing a representation of the remote robotic device and any components of the remote robotic device at the layer, wherein the layered image comprises an outer layer representing an external illustration of the remote robotic device and components of the remote robotic device, at least one inner layer representing an internal illustration of the remote robotic device and components of the remote robotic device, and a functions layer illustrating components having a similar function;
   receiving a request to display a first layer of the remote robotic device, the first layer illustrating information associated with one or more of the at least one sensor component and one mechanical actuator component; and
   providing an image of the first layer of the remote robotic device.

2. The method of claim 1, wherein generating the layered image of the remote robotic device comprises generating a three-dimensional image.

3. The method of claim 1, wherein the at least one inner layer representing the internal illustration of the remote robotic device and components of the remote robotic device provides a structural representation of the remote robotic device.

4. The method of claim 1, wherein the at least one inner layer representing the internal illustration of the remote robotic device and components of the remote robotic device illustrates internal components of the remote robotic device and interconnects of the internal components.

5. The method of claim 1, further comprising
receiving information associated with one of the remote robotic device or a given component of the remote robotic device, the information indicating capabilities of the remote robotic device or the given component of the remote robotic device; and
providing in the layered image of the remote robotic device, the information indicating the capabilities of the remote robotic device or the given component of the remote robotic device.

6. The method of claim 5, wherein the information indicating capabilities of the remote robotic device or the given component of the remote robotic device further provides a maintenance record of the remote robotic device or the given component of the remote robotic device, the maintenance record indicating at least one of installation, usage and maintenance histories of the remote robotic device or given component of the remote robotic device.

7. The method of claim 1, further comprising:
receiving a request to view the functions layer; and
providing in the layered image of the remote robotic device, the functions layer and the information indicating the functions of the components illustrated in the functions layer.

8. The method of claim 1, wherein the functions layer is a cognitive layer, the cognitive layer illustrating data processor components.

9. The method of claim 1, wherein the remote robotic device is configured to perform a task utilizing a group of components of the remote robotic device, and wherein the layered image of the remote robotic device further comprises a task group layer illustrating the group of components utilized to perform the task.

10. The method of claim 9, further comprising:
receiving a request to view the task group layer; and
providing in the layered image of the remote robotic device, the task group layer and information associated with the components illustrated in the task group layer.

11. The method of claim 9, wherein the task is movement and wherein the group of components illustrated in the task group layer comprises at least one of a motorized wheel, an accelerometer, and a control processor.

12. The method of claim 9, wherein the task is video capture and wherein the group of components illustrated in the task group layer comprises at least one of a video camera, a video processor unit and a video storage unit.

13. The method of claim 1, further comprising:
receiving a request to modify a configuration of the device and components of the remote robotic device;
receiving modification information associated with a new configuration of the remote robotic device and components of the remote robotic device; and
modifying the layered image according to the new configuration of the remote robotic device and components of the remote robotic device.

14. The method of claim 13, further comprising:
providing in the layered image of the remote robotic device a super-imposed layered image of the modified layered image of the new configuration of the remote robotic device and components of the remote robotic device and the layered image of the current configuration of the remote robotic device and components of the remote robotic device.

15. The method of claim 1, further comprising displaying the layered image of the remote robotic device on a display.

16. The method of claim 1, further comprising:
a computing device receiving the information associated with the remote robotic device; and
based on the information, the computing device determining the outer layer representing the external illustration of the remote robotic device and components of the remote robotic device and the at least one inner layer representing the internal illustration of the remote robotic device and components of the remote robotic device; and
the computing device generating the layered image of the remote robotic device.

17. The method of claim 1, further comprising:
a computing device receiving the information associated with the remote robotic device;
accessing a server to determine the outer layer representing the external illustration of the device and components of the device and the at least one inner layer representing the internal illustration of the remote robotic device and components of the remote robotic device; and
the computing device generating the layered image of the remote robotic device.

18. A non-transitory computer readable medium having stored thereon instructions executable by a computing device to cause the computing device to perform functions comprising:
receiving a request for a layered image of a robotic device having at least one sensor component and one mechanical actuator component;
querying the robotic device for device information associated with the robotic device; the device information indicating components of the device including the at least one sensor component and one mechanical actuator component;
receiving device information associated with the robotic device, the device information indicating components of the robotic device;
generating the layered image of the robotic device based on the received device information, the layered image illustrating multiple layers, each layer of the layered image providing a representation of the device and components of the robotic device at the layer, wherein the layered image comprises an outer layer representing an external illustration of the robotic device and components of the robotic device and at least one inner layer representing an internal illustration of the robotic device and components of the robotic device;
receiving information associated with one of the robotic device or a given component of the robotic device, the information indicating capabilities of the robotic device or the given component of the robotic device;
providing in the layered image of the robotic device, the information indicating the capabilities of the robotic device or the given component of the robotic device;
receiving a request to display a sensor layer of the robotic device, the sensor layer illustrating the at least one sensor component; and
providing an image of the sensor layer of the robotic device.

19. A device comprising:
a processor; and memory including instructions stored therein executable by the processor to perform functions comprising:

receiving a request for a layered image of a robotic device having at least one sensor component and one mechanical actuator component;

querying the robotic device for device information associated with the robotic device; the device information indicating components of the device including the at least one sensor component and one mechanical actuator component;

receiving device information associated with the robotic device, the device information indicating components of the robotic device;

generating the layered image of the device based on the received device information, the layered image illustrating multiple layers, each layer of the layered image providing a representation of the robotic device and components of the device at the layer, wherein the layered image comprises an outer layer representing an external illustration of the robotic device and components of the robotic device and at least one inner layer representing an internal illustration of the robotic device and components of the robotic device;

receiving a request to display a first layer of the robotic device, the first layer illustrating information associated with one or more of the at least one sensor component and one mechanical actuator component;

providing a display of the first layer of the robotic device;

receiving a request to display a cognitive layer of the robotic device, the cognitive layer illustrating information associated with at least one data processing component of the remote robotic device; and providing a display of the cognitive layer of the robotic device.

20. The device of claim 19, further comprising instructions stored in the memory executable by the processor to perform functions comprising:

receiving a request to modify a configuration of the robotic device and components of the robotic device;

receiving modification information associated with a new configuration of the robotic device and components of the robotic device; and modifying the layered image according to the new configuration of the robotic device and components of the robotic device.

21. The device of claim 19, further comprising instructions stored in the memory executable by the processor to perform functions comprising:

receiving information associated with one of the remote robotic device or a given component of the remote robotic device, the information indicating capabilities of the remote robotic device or the given component of the remote robotic device; and providing in the layered image of the remote robotic device, the information indicating the capabilities of the remote robotic device or the given component of the remote robotic device.

22. The device of claim 19, further comprising a display, wherein instructions stored in the memory executable by the processor to perform functions further comprise displaying the layered image of the remote robotic device on the display.

23. The device of claim 19, further comprising instructions stored in the memory executable by the processor to perform functions comprising:

receiving input data indicating functional instructions for the at least one sensor component and one mechanical actuator component, the functional instructions indicating actions performable by the at least one sensor component and one mechanical actuator;

causing the remote robotic device to execute the functional instructions.

24. The device of claim 19, wherein the device is a mobile device configured to be in wireless communication with the remote robotic device.

* * * * *